(12) United States Patent
Burkart et al.

(10) Patent No.: US 7,428,113 B2
(45) Date of Patent: Sep. 23, 2008

(54) DEVICE FOR READING FROM AND/OR WRITING TO OPTICAL RECORDING MEDIA

(75) Inventors: Harald Burkart, Villingen-Schwenningen (DE); Frank Strauch, St. Augustin (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 11/087,940

(22) Filed: Mar. 23, 2005

(65) Prior Publication Data

US 2005/0225883 A1 Oct. 13, 2005

(30) Foreign Application Priority Data

Apr. 7, 2004 (DE) .................. 10 2004 017 551

(51) Int. Cl.
*G02B 7/02* (2006.01)
(52) U.S. Cl. .................. 359/819; 359/719; 359/809; 359/30
(58) Field of Classification Search .................. 359/819
See application file for complete search history.

(56) References Cited

U.S. PATENT DOCUMENTS

| | | | |
|---|---|---|---|
| 5,249,082 A * | 9/1993 | Newman | ..................... 359/813 |
| 5,805,364 A | 9/1998 | Ooi et al. | |
| 6,108,292 A * | 8/2000 | Zijp | ..................... 369/112.24 |
| 6,411,446 B1 | 6/2002 | Yamashita et al. | |
| 6,665,132 B2 * | 12/2003 | Hendriks et al. | ............. 359/819 |
| 7,031,081 B2 * | 4/2006 | Petroff | ................ 359/819 |
| 2002/0184919 A1 * | 12/2002 | Otsuki et al. | ................ 65/39 |
| 2003/0043728 A1 * | 3/2003 | Kan et al. | ................ 369/244 |

FOREIGN PATENT DOCUMENTS

| | | |
|---|---|---|
| EP | 0 816 889 A1 | 1/1998 |
| JP | 05-243553 | 9/1993 |
| JP | 07-129965 | 5/1995 |
| JP | 11312316 A | 11/1999 |
| JP | 2001-272586 | 10/2001 |
| JP | 2004-029101 | 1/2004 |
| WO | WO 90/02967 | 3/1990 |
| WO | WO 03/087944 A2 | 10/2003 |

OTHER PUBLICATIONS

German Search Report dated Apr. 20, 2004.

* cited by examiner

*Primary Examiner*—Jessica T Stutz
(74) *Attorney, Agent, or Firm*—Joseph J. Laks; Robert D. Shedd; Reitseng Lin

(57) ABSTRACT

The present invention relates to a device for reading from and/or writing to optical recording media, having a light source for producing a scanning beam for scanning the optical recording medium, detection means for detecting the beam influenced by the optical recording medium, and an optical element arranged in the optical beam path by means of a holder. The optical element has in a plane perpendicular to the axis of the beam path outer boundary lines inclined to one another in such a way as to enable a unique orientation. The holder has a cutout with correspondingly inclined inner boundary lines.

18 Claims, 3 Drawing Sheets

DEVICE FOR READING FROM AND/OR WRITING TO OPTICAL RECORDING MEDIA

This application claims the benefit, under 35 U.S.C. § 119 of German Patent Application 102004017551.9, filed Apr. 7, 2004.

FIELD OF THE INVENTION

The invention relates to a device for reading from and/or writing to optical recording media, having a light source for producing a scanning beam that serves for scanning the optical recording medium, detection means for detecting the beam influenced by the optical recording medium, and an optical element arranged in the optical beam path by means of a holder.

BACKGROUND OF THE INVENTION

It is a constant desire to further develop such a devices for reading from and/or writing to optical recording media.

SUMMARY OF THE INVENTION

It is provided according to the invention that the optical element has in a plane perpendicular to the axis of the beam path outer boundary lines inclined to one another in such a way as to enable a unique orientation, and that the holder has a cutout with correspondingly inclined inner boundary lines. This has the advantage that it is no longer possible to mistake the orientation of the optical element in the holder. This simplifies the assembly of holder and optical element, subsequent inspection can be eliminated, and yet a low error rate, virtually "zero error", is achieved since possible errors owing to the geometry of the components are excluded.

It is provided according to the invention that the outer boundary lines of the optical element form a rhomboid. This has the advantage that a rhombus is a geometrical shape that can be derived simply from a larger blank. Owing to parallel cut edges, no or only slight losses occur even when a relatively large number of identical parts are cut out of a blank. The rotational symmetry of a rhomboid for rotation about an axis perpendicular to the plane of the boundary lines has no effect on the orientation when the relevant optical influence exerted by the optical element has appropriate symmetry properties. This is so, for example, in the case of the grating lines of an optical grating, particularly when these are arranged perpen-dicular or parallel to one of the pairs of boundary lines, or in the case of a cylindrical lens. A further advantage in this case is that rotation of the optical element by 180° with reference to an axis in the plane of the boundary lines has the effect that said element no longer fits into the corresponding cutout in the holder, something which is advantageous, in particular, whenever such an operation is not desired. This is the case, for example, when grating lines are arranged on one side of a surface of the optical element, and the top/bottom orientation is therefore important.

It is provided according to the invention that the holder has a number of cutouts with differently inclined boundary lines. This has the advantage that the same holder can be used for different optical elements that likewise differ in the inclination of the boundary lines. Care is to be exercised in this case that a cutout lying further inside is not blocked by a smaller geometry of a cutout lying further outside. It is thereby possible both to provide in each case only a single optical element per holder, but to design the same sort of holder for different optical elements. This simplifies production, since it is not necessary to distinguish different sorts of holders before the holders are combined with the optical element. Production and logistics such as, for example, storage and transportation are simplified by a lesser number of different elements. However, according to the invention it is likewise possible to accommodate a number of optical elements simultaneously in the holder. The different geometries of the cutouts and of the corresponding optical elements thereby prevent mistakes during assembly and ensure correct orientation of the optical elements relative to one another without the large outlay.

The holder preferably has at least one opening that reaches as far as the region of the cutout and through which it is possible for a safeguarding element that is arranged on the device to reach in up to the region of the cutout in the correct installed state of the holder. This has the advantage of preventing erroneous installation in the case of holders with a number of cutouts for potentially a number of optical elements, but in the case of which it is not intended to provide all the cutouts with optical elements in the installed position provided. In this case, the safeguarding element projects into the region in which no optical element is correctly to be located. If, nevertheless, there is an optical element present, the safeguarding element prevents the correct installation of the holder, and this avoids erroneous installation. This is advantageous, in particular, whenever two or more different optical elements are held in the device by means of identical holders. In this case, for example, it is superfluous to distinguish the holders, since erroneous installation is excluded.

A device preferably has a number of holders at different positions in the beam path. This has the advantage that identical holders that are provided with different optical elements simplify mounting, since in each case only one tool is required for mounting or adjusting both or all the optical elements, since the holders have identical external dimensions and engagement elements.

According to the invention, a diffraction grating is provided as optical element. Diffraction gratings are frequently used in devices for reading from and/or writing to optical recording media, for example for generating secondary beams of ±1st order for the so-called three-beam track guidance method, or for generating secondary beams for the so-called differential push-pull track guidance method. The requirements placed on the orientation of such a diffraction grating are such that a satisfactory, but not too complicated alignment is achieved with the combination of features according to the invention.

The invention also relates to a holder for a device according to the invention.

Further advantages of the invention are also to be gathered from the following description of an exemplary embodiment. It goes without saying that combinations other than those explicitly specified, and modifications within the scope of actions by experts are also within the scope of the invention, as well.

DETAILED DESCRIPTION OF PREFERRED EMBODIMENTS

Figure 1:
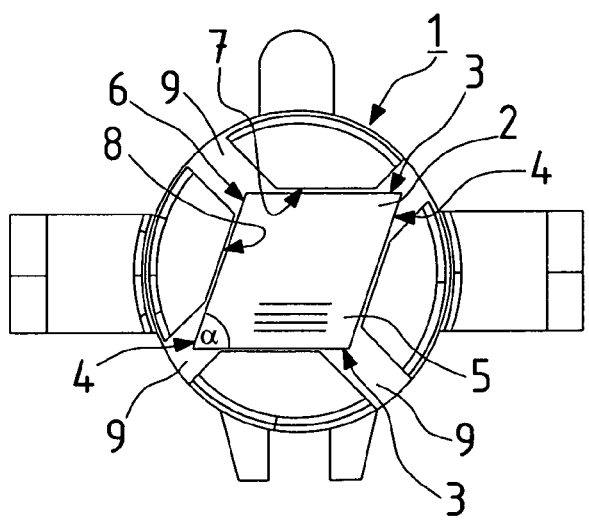
FIG. 1 shows a front view of a holder and optical element of a device according to the invention.

FIG. 1 shows a front view of a holder 1 and an optical element 2 of a device according to the invention. Further elements of the device according to the invention are explained in more detail below in relation to FIG. 7. The optical element 2 is designed as a rhomboid, and has a rhombic cross section in the plane of the drawing. The holder 1 is arranged in the beam path (not illustrated here) such that the axis of the beam path is perpendicular to the plane of a drawing. The outer boundary lines 3, 4 of the optical element 2 form pairs 3, 4 of parallel lines. The boundary lines 3, 4 are at an angle α to one another that is smaller than 90°. In the exemplary embodiment, the optical element 2 is an optical grating whose grating lines 5 are parallel to the outer boundary lines 3, as is indicated here schematically.

The holder 1 has a cutout 6 whose inner boundary lines 7, 8 are arranged parallel to the outer boundary lines 3, 4 of the optical element 2, such that the optical element 2 can be inserted with an accurate fit into the cutout 6 in the holder 1. The holder 1 also has fixing pockets 9 that merge into the cutout 6. A fixing element is introduced into one or more of the fixing pockets 9 after the optical element 2 has been arranged in the correct position in the holder 1. An adhesive or a mechanical clamping element (neither illustrated here), for example, serves as fixing element.

Figure 2:
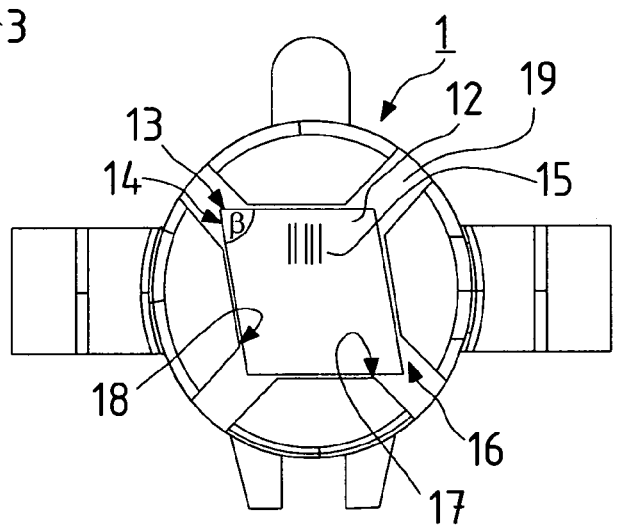
FIG. 2 shows a rear view of a holder and optical element of a device according to the invention.

FIG. 2 shows a rear view of the holder 1 from FIG. 1. A further optical element 12 is to be seen, its cross section in the plane of the drawing being a rhombus that has outer pairs 13, 14 of boundary lines. Said pairs enclose an acute angle β that is likewise smaller than 90° but also not equal to the angle α. The further optical element 12 is likewise an optical grating. The grating lines 15 are illustrated by the example as being arranged perpendicular to the outer boundary lines 13. The holder 1 has a cutout 16 whose inner boundary lines 17, 18 are arranged parallel to the outer boundary lines 13, 14, and thereby enable the optical element 12 to be introduced into the cutout 16 with an accurate fit. Fixing pockets 19 are again also provided here. It is to be seen that the holder 1 has mutually parallel inner boundary lines 7, 17 of the different cutouts 6, 16. In the example illustrated, this ensures that the grating lines 5, 15 are arranged perpendicular to one another. In general, the grating lines 5, 15 of the two optical elements 2, 12 are arranged, however, virtually parallel to one another. Other alignments of the optical elements 2, 12 relative to one another are likewise within the scope of the invention.

Figure 3:
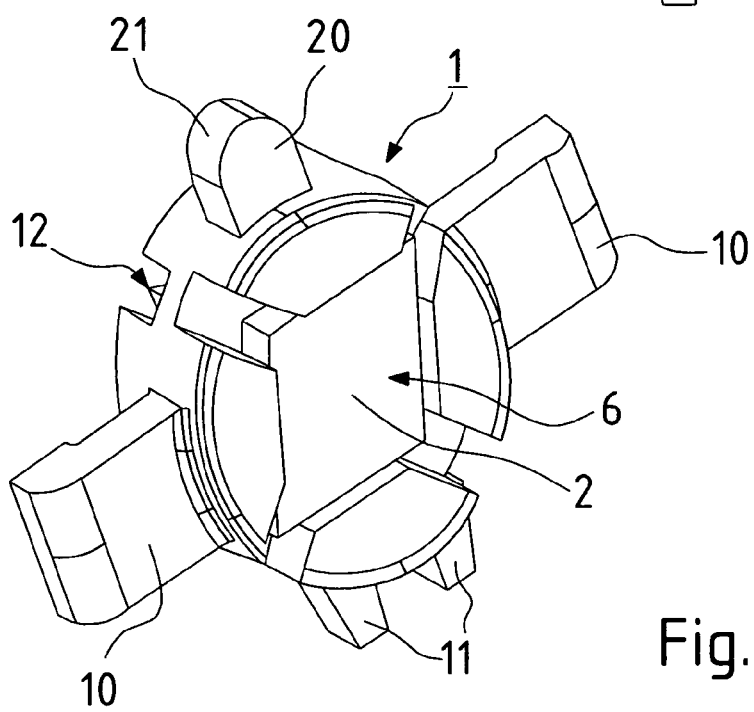
FIG. 3 shows a three-dimensional illustration of a holder and optical element of a device according to the invention.

FIG. 3 shows a holder 1 in accordance with the invention in a three-dimensional illustration. The optical element 2 in the cutout 6 is to be seen, as is a small part of the further optical element 12, which is arranged in the rear cutout 16 (not visible here). In the configuration illustrated here, the holder 1 has a number of different optical elements 2, 12 at the same time. The holder 1 has holding elements 10 that are arranged at the side, as well as adjusting elements 11 illustrated at the bottom in the illustration. Illustrated at the top is a foot 20 that has a rounded mounting surface 21.

Figure 4:
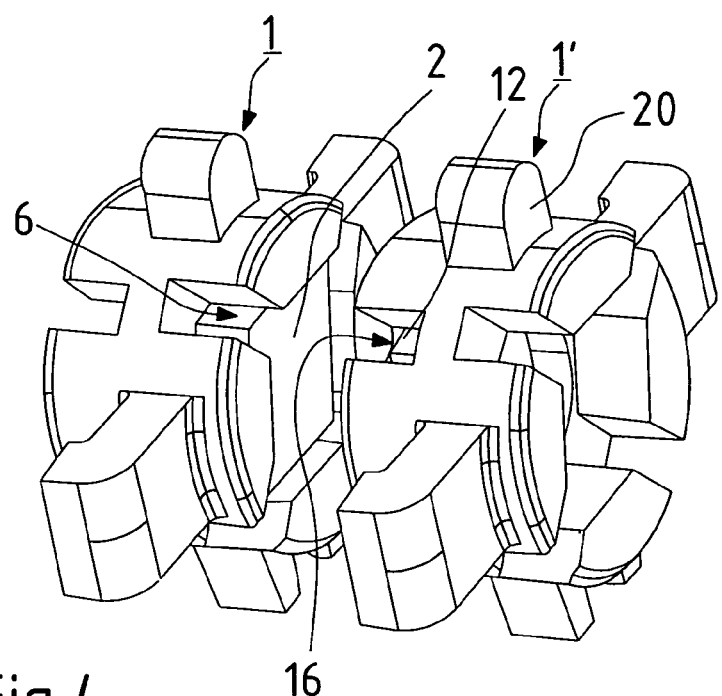
FIG. 4 shows two holders with different optical elements in accordance with the invention.

FIG. 4 shows two sequentially arranged holders 1, 1' that are identical, but which have different optical elements 2, 12 in the respective cutout 6, 16, while the respective other cutout 16, 6 is empty.

Figure 5:
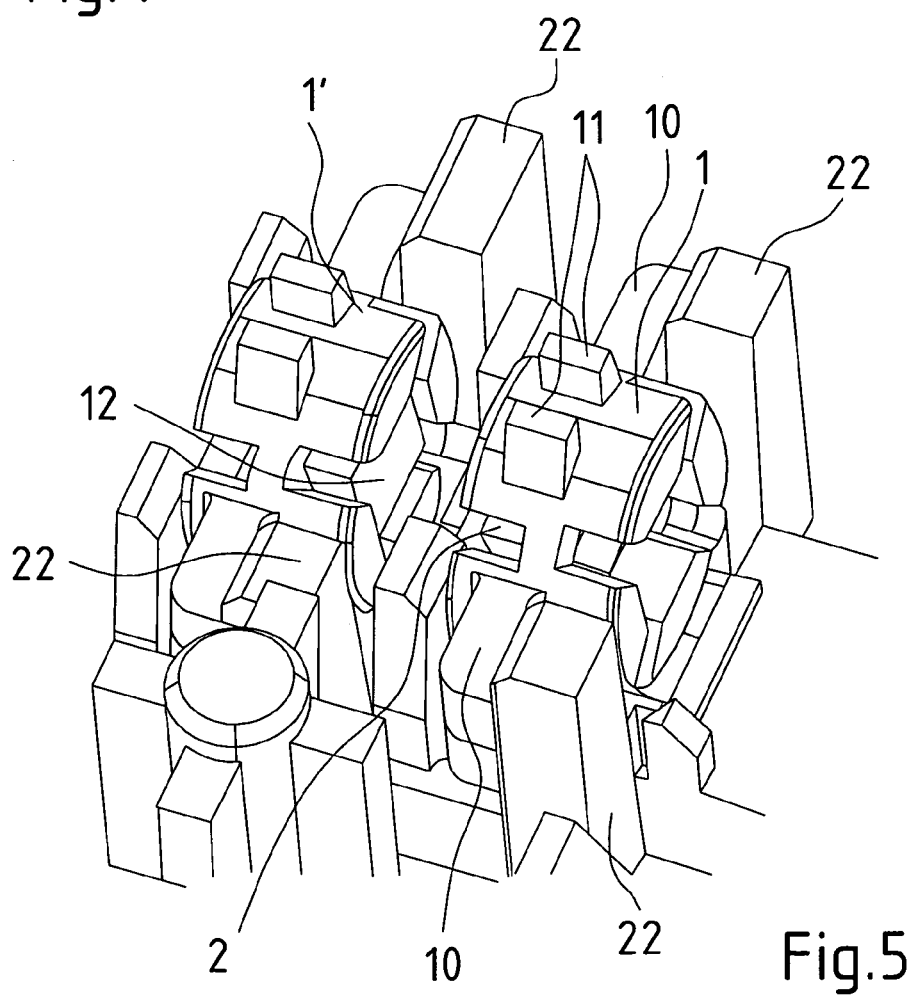
FIG. 5 shows the installed state of the holders in accordance with FIG. 4.

FIG. 5 shows the holders 1, 1' of FIG. 4 in the installed state. The foot 20 (not visible here) is located in a receptacle (likewise not visible here) with a corresponding rounded shape such that it is possible for the holder 1, 1' to be tilted slightly in accordance with the rounded mounting surface 21. For this purpose, a suitable tool is used to act on the adjusting elements 11. The holding elements 10 bear resiliently against supports 22, and thereby hold the holding element 1, 1' in position. After fine adjustment of the holding element 1, 1' by means of the adjusting elements 11, the position of the former is fixed, if possible by adhesion or similar measures.

Figure 6:
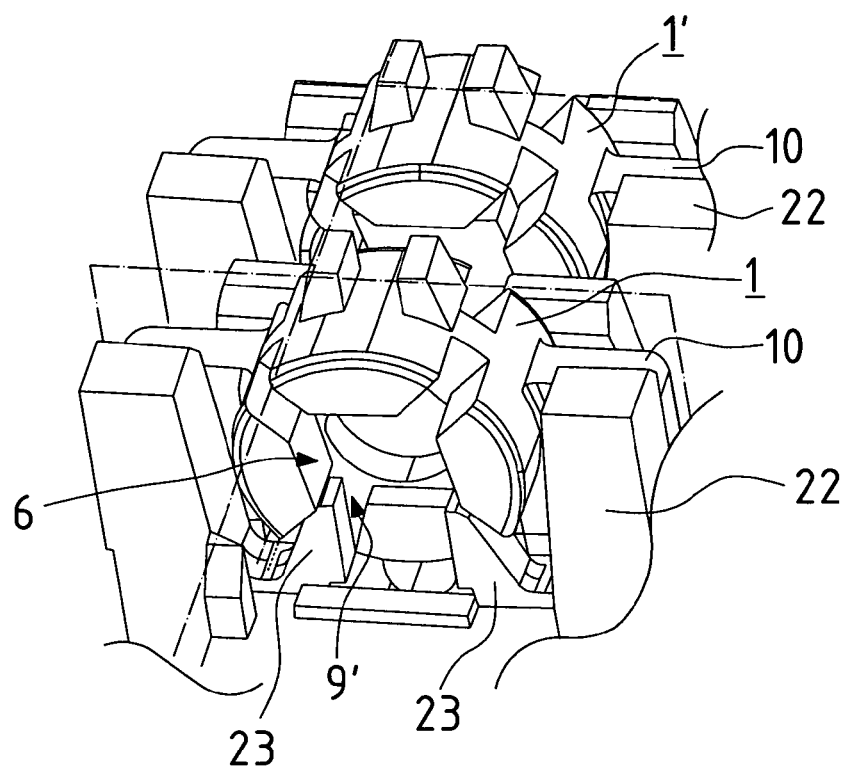
FIG. 6 shows the installed state of a holder with safeguarding element.

FIG. 6 shows the installed state of holders 1, 1' that are provided for the purpose of co-operating with safeguarding elements 23. The holders 1, 1' depicted here are essentially identical to those previously described, but differ in that two of the fixing pockets 9' are dimensioned to be somewhat larger such that safeguarding elements 23 that are fitted on the device can project into these fixing pockets 9'. They do this in the installed state of the corresponding holder 1. In this case, the safeguarding element 23 projects so far into the cutout 6 that it would collide with an optical element 2' located therein were the latter to be located therein. This prevents a holder 1, 1', which is provided with an optical element 2, 2' that is not provided at the corresponding installed position, from being capable of complete insertion into the corresponding installed position. Erroneous mounting is thereby prevented.

Figure 7:
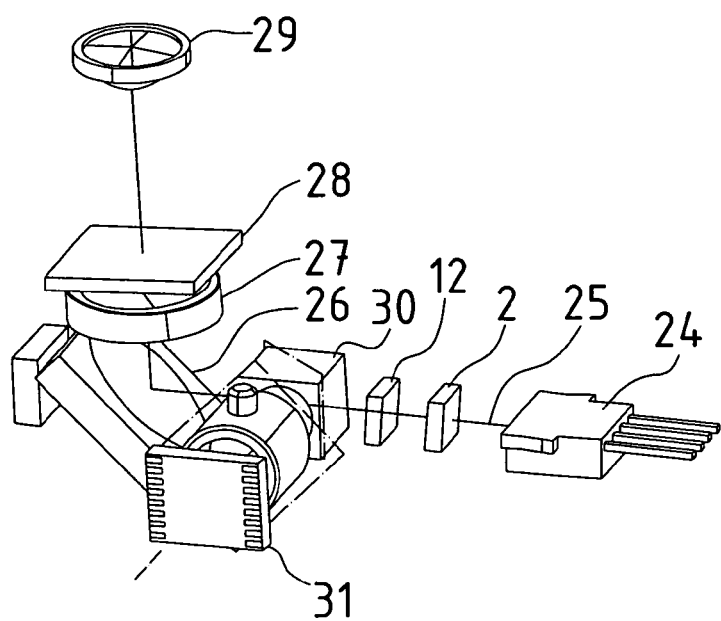
FIG. 7 shows the beam path in a device according to the invention.

FIG. 7 shows a schematic of the beam path in a device according to the invention. A light source, here a twin laser diode 24, produces a linearly polarized scanning beam 25 that passes the optical elements 2, 12 arranged along the beam path, is deflected by a mirror 26, passes a collimator 27 and a λ/4 plate, and is focused by an objective lens 29 onto an optical recording medium (not illustrated here). From there, the scanning beam 25 is reflected and passed onto a detector element 31 by a polarizing beam splitter 30. The optical elements 2, 12 designed as diffraction gratings produce secondary beams of ±1st order in the scanning beam 25, which are later used to determine a track error signal in accordance with the three-beam track guidance method or in accordance with a differential push-pull track guidance method. The twin laser diode 24 is capable of outputting scanning beams of different wavelength that are suitable for scanning different optical recording media such as, for example, CD and DVD. One of the optical elements 2, 12 is adapted in each case to respectively one of these wavelengths. Owing to the design, influences on the respective other wavelength are reduced so far that their disturbing influence is acceptable.

In other words, the invention relates to a holder 1 for optical components 2, 12 preferably in the field of DVD and CD pickups. A holder 1 accommodates two or more optical components 2, 12, for example diffraction gratings, without it being possible for the parts to be mistaken inside the holder 1. The geometries of the optical components 2, 12 and of the holder 1 are fastened such that the components 2, 12 can be connected to one another only in one position and location. The geometry of the optical elements 2, 12 and of the holder 1 are preserved in this case such that production is possible in a simple and cost effective way. The optical elements 2, 12 are preferably designed as a rhomboid or parallelogram with different angles α, β. The receptacles 6, 16 inside the holder 1 have a correspondingly complementary angle in order to avoid false positioning or mistakes. If the holder 1 is designed with a number of rhomboidal receptacles 6, 16 with different angles $\alpha 1 \neq \alpha 2 \neq \ldots$ , it is possible to use this holder 1 to fix different components 2, 12 at the same time. It is therefore not necessary to produce a separate holding part for each type of optical element 2, 12. Inadvertent interchange of the optical elements 2, 12 inside the holder 1 is excluded by the different angles. Furthermore, the angles of the rhomboids have the effect that the optical elements 2, 12 have been installed in the correct position, since the top and bottom sides cannot be interchanged. This type of holder 1 can be used wherever optical elements 2, 12 have to be accommodated or fixed by means of a separate holder 1. If there is no need to adjust the optical elements 2, 12 by rotating them relative to one another, a single holder 1 can also accommodate a number of optical elements 2, 12 at the same time.

What is claimed is;

1. A device for reading from and/or writing to optical recording media, having a light source for producing a scanning beam for scanning the optical recording medium, detection means for detecting the beam influenced by the optical recording medium, and an optical element arranged in the optical beam path by means of a holder, in which the optical element has outer boundary lines that extend in a direction perpendicular to an axis of the optical beam path and are inclined to one another in such a way as to enable a unique orientation, and the holder has a cutout with inner boundary lines inclined to match the outer boundary lines of the optical element.

2. The device as claimed in claim 1, wherein said device includes a plurality of holders at different positions in the beam path.

3. The device as claimed in claim 1, wherein the holder includes a plurality of cutouts with differently inclined boundary lines.

4. The device as claimed in claim 3, wherein said device includes a plurality of holders at different positions in the beam path.

5. The device as claimed in claim 3, wherein the optical element is a diffraction grating.

6. The device as claimed in claim 3, wherein the holder has an opening which reaches up to a region of a first one of the cutouts and through which a safeguarding element arranged on the device reaches in up to the region of the first cutout in an installed state of the holder.

7. The device as claimed in claim 1, wherein the outer boundary lines of the optical element are arranged in the form of a rhombus.

8. The device as claimed in claim 7, wherein said device includes a plurality of holders at different positions in the beam path.

9. The device as claimed in claim 7, wherein the optical element is a diffraction grating.

10. The device as claimed in claim 7, wherein the holder includes a plurality of cutouts with differently inclined boundary lines.

11. The device as claimed in claim 10, wherein said device includes a plurality of holders at different positions in the beam path.

12. The device as claimed in claim 10, wherein the optical element is a diffraction grating.

13. The device as claimed in claim 10, wherein the holder has an opening which reaches up to a region of a first one of the cutouts and through which a safeguarding element arranged on the device reaches in up to the region of the first cutout in an installed state of the holder.

14. A device for reading from and/or writing to an optical recording medium, said device comprising:
 a light source for producing an optical beam for scanning the optical recording medium;
 a holder having a cutout formed therein;
 an optical element positioned in the cutout and in a path of the optical beam; and
 wherein the optical element includes outer boundary lines arranged in a form of a rhomboid, and the cutout includes inner boundary lines inclined corresponding to the outer boundary lines of the optical element.

15. The device as claimed in claim 14, wherein said device includes a plurality of holders at different positions in the path of the optical beam.

16. The device as claimed in claim 14, wherein the holder includes an opening which reaches up to a region of the cutout and through which a safeguarding element arranged on the device reaches in up to the region of the cutout in an installed state of the holder.

17. The device as claimed in claim 14, wherein:
 the holder includes first and second sides;
 the cutout is formed in the first side of the holder;
 a second cutout is formed in the second side of the holder;
 a second optical element is positioned in the second cutout and in the path of the optical beam;
 the second optical element includes outer boundary lines arranged in the form of a rhomboid; and
 the second cutout includes inner boundary lines inclined corresponding to the outer boundary lines of the second optical element.

18. A device for reading from and/or writing to an optical recording medium, said device comprising:
 a light source for producing an optical beam for scanning the optical recording medium;
 a holder having first and second sides with a first cutout formed in the first side and a second cutout formed in the second side;
 a first optical element having outer boundary lines arranged in a form of a first rhomboid, the first optical element being positioned in the first cutout and in a path of the optical beam;
 a second optical element having outer boundary lines arranged in a form of a second rhomboid having an angular dimension different than the first rhomboid, the second optical element being positioned in the second cutout and in the path of the optical beam; and
 wherein the first cutout includes inner boundary lines inclined corresponding to the outer boundary lines of the first optical element and the second cutout includes inner boundary lines inclined corresponding to the outer boundary lines of the second optical element.

* * * * *